United States Patent
Razak

(10) Patent No.: US 11,685,541 B2
(45) Date of Patent: **\*Jun. 27, 2023**

(54) TURBO ENGINE WITH COOLER FOR COOLING INLET AIR AND TURBINE FOR EXPANDING CRYOGENIC FUEL

(71) Applicant: ROLLS-ROYCE plc, London (GB)

(72) Inventor: Ahmed My Razak, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,100

(22) Filed: Jun. 10, 2022

(65) Prior Publication Data

US 2022/0297847 A1 Sep. 22, 2022

Related U.S. Application Data

(63) Continuation of application No. 16/866,908, filed on May 5, 2020, now Pat. No. 11,383,852.

(30) Foreign Application Priority Data

May 20, 2019 (GB) ...................................... 1907077

(51) Int. Cl.
*F02C 7/224* (2006.01)
*B64D 33/02* (2006.01)
(Continued)

(52) U.S. Cl.
CPC ............. *B64D 33/02* (2013.01); *B64D 27/16* (2013.01); *F02C 3/22* (2013.01); *F02C 7/04* (2013.01);
(Continued)

(58) Field of Classification Search
CPC ........................... F02C 7/224; B64D 2033/024
See application file for complete search history.

(56) References Cited

U.S. PATENT DOCUMENTS 3,237,400 A * 3/1966 Kuhrt ...................... F02C 7/224
60/260
3,237,401 A * 3/1966 Peters ...................... F02C 7/224
60/260
(Continued)

FOREIGN PATENT DOCUMENTS

CN 107630767 A 1/2018
DE 102004024294 A1 * 12/2005 ............... F02K 7/16
(Continued)

OTHER PUBLICATIONS

Diane Tedeschi, "How Things Work: Supersonic Inlets", Smithsonian Air and Space Magazine, Nov. 2002, URL: https://www.smithsonianmag.com/air-space-magazine/how-things-work-supersonic-inlets-35428453/ (Year: 2002).*

(Continued)

*Primary Examiner* — Todd E Manahan
*Assistant Examiner* — Marc J Amar
(74) *Attorney, Agent, or Firm* — Oliff PLC

(57) ABSTRACT

An air-breathing turbojet engine for a hypersonic vehicle is shown. The engine comprises a pump for pumping a cryogenic fuel, an inlet configured to compress inlet air by one or more shocks, a cooler to cool the compressed inlet air using the cryogenic fuel, and a turbo-compressor to compress the air further. A precooler cools the compressed inlet air using compressed cooled air from the turbo-compressor. A combustor receives compressed cooled air from the turbo-compressor and a first portion of the cryogenic fuel for combustion. A first turbine expands and is driven by combustion products, and a second turbine expands and is driven by a second portion of the cryogenic fuel. The first turbine and the second turbine drive the turbo-compressor via a shaft. An afterburner receives combustion products from the (Continued)

first turbine and the second portion of the cryogenic fuel from the second turbine for combustion therein.

15 Claims, 5 Drawing Sheets

(51) Int. Cl.
  *B64D 27/16* (2006.01)
  *F02C 3/22* (2006.01)
  *F02C 7/04* (2006.01)
  *F02C 7/08* (2006.01)
(52) U.S. Cl.
  CPC .............. *F02C 7/08* (2013.01); *F02C 7/224* (2013.01); *B64D 2033/024* (2013.01); *B64D 2033/026* (2013.01); *B64D 2033/0273* (2013.01)

(56) References Cited

U.S. PATENT DOCUMENTS

| | | | | | |
|---|---|---|---|---|---|
| 3,477,505 | A | * | 11/1969 | McGann | F02C 7/08 165/DIG. 427 |
| 3,705,496 | A | * | 12/1972 | Wolf | F02K 3/02 60/768 |
| 3,721,093 | A | * | 3/1973 | Wolf et al. | F02C 7/08 60/267 |
| 4,224,790 | A | | 9/1980 | Christensen | |
| 4,771,601 | A | * | 9/1988 | Spies | F02K 9/48 60/260 |
| 5,101,622 | A | * | 4/1992 | Bond | F02K 9/78 60/768 |
| 5,165,227 | A | | 11/1992 | Grieb | |
| 9,957,892 | B2 | * | 5/2018 | Pomerleau | F02C 3/04 |
| 2015/0101308 | A1 | * | 4/2015 | Bond | F02K 9/64 60/225 |
| 2019/0293024 | A1 | * | 9/2019 | Carter | F02C 7/224 |
| 2020/0088098 | A1 | * | 3/2020 | Roberge | F02C 7/16 |
| 2020/0088099 | A1 | * | 3/2020 | Roberge | F02C 7/224 |
| 2020/0386189 | A1 | * | 12/2020 | Powell | F02K 3/11 |

FOREIGN PATENT DOCUMENTS

| | | | | |
|---|---|---|---|---|
| DE | 102004024294 A1 | | 12/2005 | |
| FR | 2687433 A1 | * | 8/1993 | .............. F02K 7/16 |
| FR | 2687433 A1 | | 8/1993 | |
| GB | 2240813 A | * | 8/1991 | .............. F02C 7/224 |
| GB | 2240813 A | | 8/1991 | |
| GB | 2 260 578 A | | 4/1993 | |
| RU | 2 239 080 C1 | | 10/2004 | |

OTHER PUBLICATIONS

Nov. 22, 2022 Office Action issued in European Patent Application No. 20172364.0.
Oct. 5, 2020 extended Search Report issued in European Patent Application No. 20172364.0.

* cited by examiner

TURBO ENGINE WITH COOLER FOR COOLING INLET AIR AND TURBINE FOR EXPANDING CRYOGENIC FUEL

CROSS-REFERENCE TO RELATED APPLICATIONS

This application is a continuation application of U.S. patent application Ser. No. 16/866,908, filed May 5, 2020, which is based upon and claims the benefit of priority from United Kingdom patent application number GB 1907077.0 filed on May 20, 2019. The entire contents of each application are incorporated herein by reference.

TECHNICAL FIELD

This disclosure concerns engines for hypersonic vehicles, in particular air-breathing turbojets for such vehicles.

BACKGROUND

The hypersonic regime is commonly defined as velocities above Mach 5. For vehicles operating at such speeds, typically at altitudes over 80,000 feet, the stagnation temperature of the surrounding air exceeds 1300 kelvin.

Whilst rockets using liquid propellant and oxidisers operate successfully in the hypersonic and high-hypersonic regimes, it is desirable to use air-breathing engines so as to improve specific fuel consumption. Engine cycles of this type have been proposed which utilise liquid hydrogen both due to its increased specific energy when compared to kerosene, but also its cryogenic storage temperatures which enable it to be used as a heatsink.

In this way, it is possible to implement a precooled turbojet cycle which reduces the inlet air temperature using the heat capacity of the liquid hydrogen fuel. This improves compression efficiency and relaxes material requirements in the gas turbine core of the turbojet.

It is an object of the present invention to provide an improved cycle compared to those previously proposed.

SUMMARY

The invention is directed to air-breathing turbojet engines for hypersonic vehicles, vehicles incorporating such engines, and methods of operating such engines.

In an aspect, there is provided such an engine, comprising:
a pump for pumping a cryogenic fuel;
an inlet configured to compress inlet air by one or more shocks, thereby producing compressed inlet air;
a cooler configured to cool the compressed inlet air using the cryogenic fuel, thereby producing cooled air;
a turbo-compressor configured to receive cooled air from the cooler and to compress the air further, thereby producing compressed cooled air;
a precooler between the inlet and the cooler, the precooler being configured to cool the compressed inlet air using compressed cooled air from the turbo-compressor;
a combustor configured to receive compressed cooled air and a first portion of the cryogenic fuel for combustion therein, thereby producing combustion products;
a first turbine configured to expand and be driven by combustion products from the combustor, and a second turbine configured to expand and be driven by a second portion of the cryogenic fuel, the first turbine and the second turbine being configured to drive the turbo-compressor via a shaft; and
an afterburner configured to receive combustion products from the first turbine and the second portion of the cryogenic fuel from the second turbine for combustion therein.

In another aspect, there is provided a vehicle comprising the aforesaid engine.

In another aspect, there is provided a method of operating an air-breathing turbojet engine for a hypersonic vehicle, comprising:
pumping a cryogenic fuel;
compressing inlet air by one or more shocks to produce compressed inlet air;
cooling the compressed inlet air using the cryogenic fuel to produce cooled air;
compressing the cooled air further in a turbo-compressor to produce compressed cooled air;
precooling the compressed inlet air in a precooler using compressed cooled air from the turbo-compressor;
combusting the compressed cooled air and a first portion of the cryogenic fuel in a combustor to produce combustion products;
driving a first turbine by expanding the combustion products therethrough, and driving a second turbine by expanding a second portion of the cryogenic fuel;
driving the turbo-compressor by the first turbine and the second turbine via a shaft;
combusting the combustion products from the first turbine and the second portion of the cryogenic fuel from the second turbine in an afterburner.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
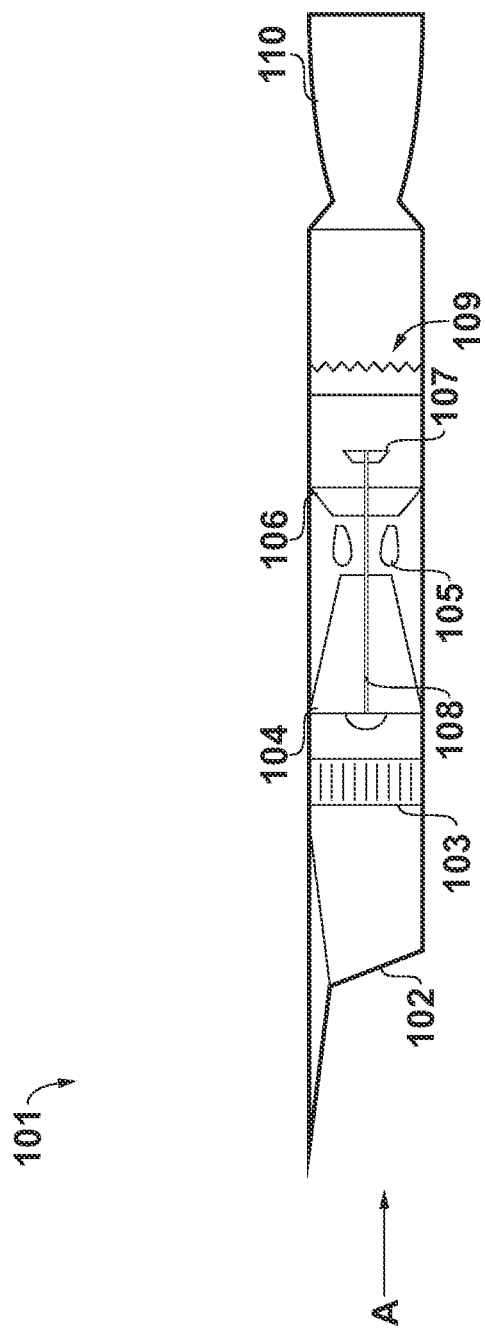
FIG. 1 shows a first embodiment of an air-breathing turbojet engine for a hypersonic vehicle.

A first embodiment of an air-breathing turbojet engine suitable for a hypersonic vehicle is shown in FIG. 1.

The engine 101 comprises, in axial flow series, an intake 102 for receiving an inlet flow of air A, a cooler 103, a turbo-compressor 104, a combustor 105, a first turbine 106, and a second turbine 107. The first turbine 106 and second turbine 107 drive the turbo-compressor 104 via a shaft 108. An afterburner 109 and a convergent-divergent nozzle 110 are provided axially downstream of the second turbine 107 to develop thrust.

Figure 2:
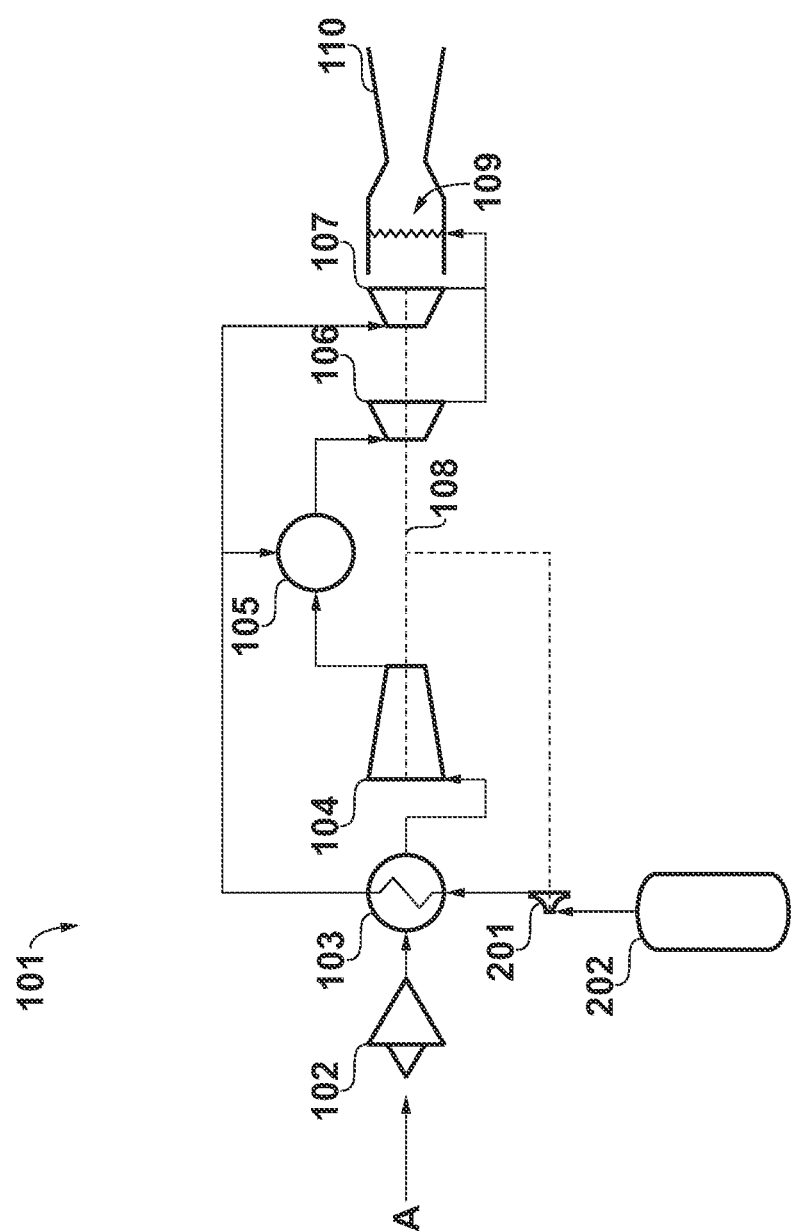
FIG. 2 shows the cycle of the engine of FIG. 1 in schematic form.

The components of the engine 101 are shown in schematic form in FIG. 2.

In addition to the components identified in FIG. 1, the engine 101 further comprises a pump 201 for pumping a liquid cryogenic fuel from a cryogenic storage tank 202.

In operation, the inlet 102 is configured to compress the inlet air A by way of one or more shocks. In an embodiment, the inlet 102 is a three-shock intake, which compresses the inlet air A via a series of three oblique shock waves. It will be appreciated that greater or fewer shocks may be used. As will be further appreciated, the intake design will likely be highly coupled with the design of the overall vehicle due to the highly non-linear nature of hypersonic aerodynamics.

The compressed inlet air from the inlet 102 is supplied to a first pass of the cooler 103, where it is cooled by high pressure fuel pumped by pump 201 through a second pass of the cooler 103.

In the present embodiment, the liquid cryogenic fuel is liquid hydrogen. In an alternative embodiment, the liquid cryogenic fuel is liquid natural gas. It will be appreciated that other liquid cryogenic fuels may be used.

In an embodiment, the cooler 103 is configured to transfer heat directly from the compressed inlet air to the fuel. An alternative configuration will be described with reference to FIG. 5, in which an intermediate fluid is utilised which may avoid issues with hydrogen fuel particularly with embrittlement of and foreign object damage to the cooler in the gas path.

In the present embodiment, the fuel is pumped at a pressure of 200 bar during a Mach 5 cruise, however alternative pressures may be used—the exact pressure depends upon the mass flow through the cooler 103 and the velocity of the vehicle.

The air cooled in the first pass of the cooler 103 is then supplied to the entrance of the turbo-compressor 104, where it is compressed prior to supply to the combustor 105.

After being heated in the second pass of the cooler 103, the fuel is supplied to the combustor for ignition and combustion with the compressed air from the turbo-compressor 104. The combustion products are then delivered to the first turbine 106 which expand therethrough and drive the turbo-compressor 104 via shaft 108. In the present embodiment, the pump 201 is also driven in this manner, indicated at 203. The pump 201 may be in-line with the compressor and turbine, or may be off-axis and drive by a radial driveshaft or similar, for example.

The amount of fuel that needs to be pumped in order to cool the compressed inlet air in the cooler 103 exceeds that required to be burnt in the combustor 105. Thus, the excess fuel is delivered to the second turbine 107 for expansion therethrough. The second turbine 107 is also connected to the turbo-compressor 104, and thus augments the first turbine 106 reducing fuel consumption.

Following expansion through the respective turbines, the combustion products and excess fuel are delivered to the afterburner 109 for complete combustion of the excess fuel therein. This is in contrast to previously proposed designs where excess fuel is simply expanded through a separate nozzle without combustion, which reduces cycle efficiency as the potential energy of the fuel is not released. Following combustion in the afterburner 109, the exhaust gases are expanded through the convergent-divergent nozzle 110 to produce thrust.

Figure 3:
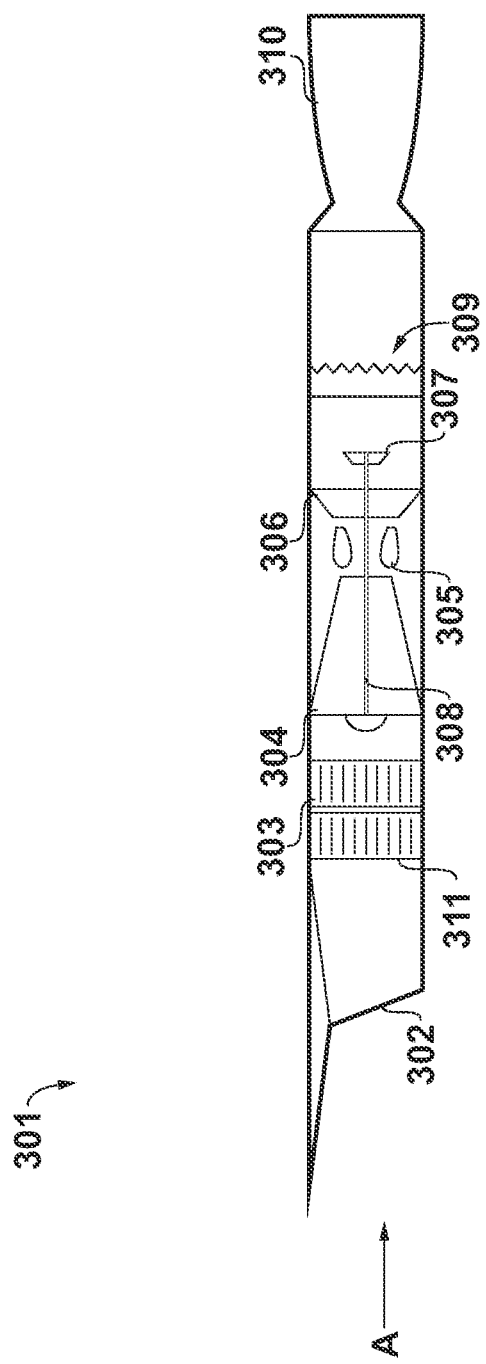
FIG. 3 shows a second embodiment of an air-breathing turbojet engine for a hypersonic vehicle.

A second embodiment of an air-breathing turbojet engine suitable for a hypersonic vehicle is shown in FIG. 3.

The engine 301 is of similar configuration to the engine 101, and thus like features are identified with like numerals incremented by 200. The engine 301 differs from the engine 101 in that it includes a precooler 311 between the inlet 302 and the cooler 303.

Figure 4:
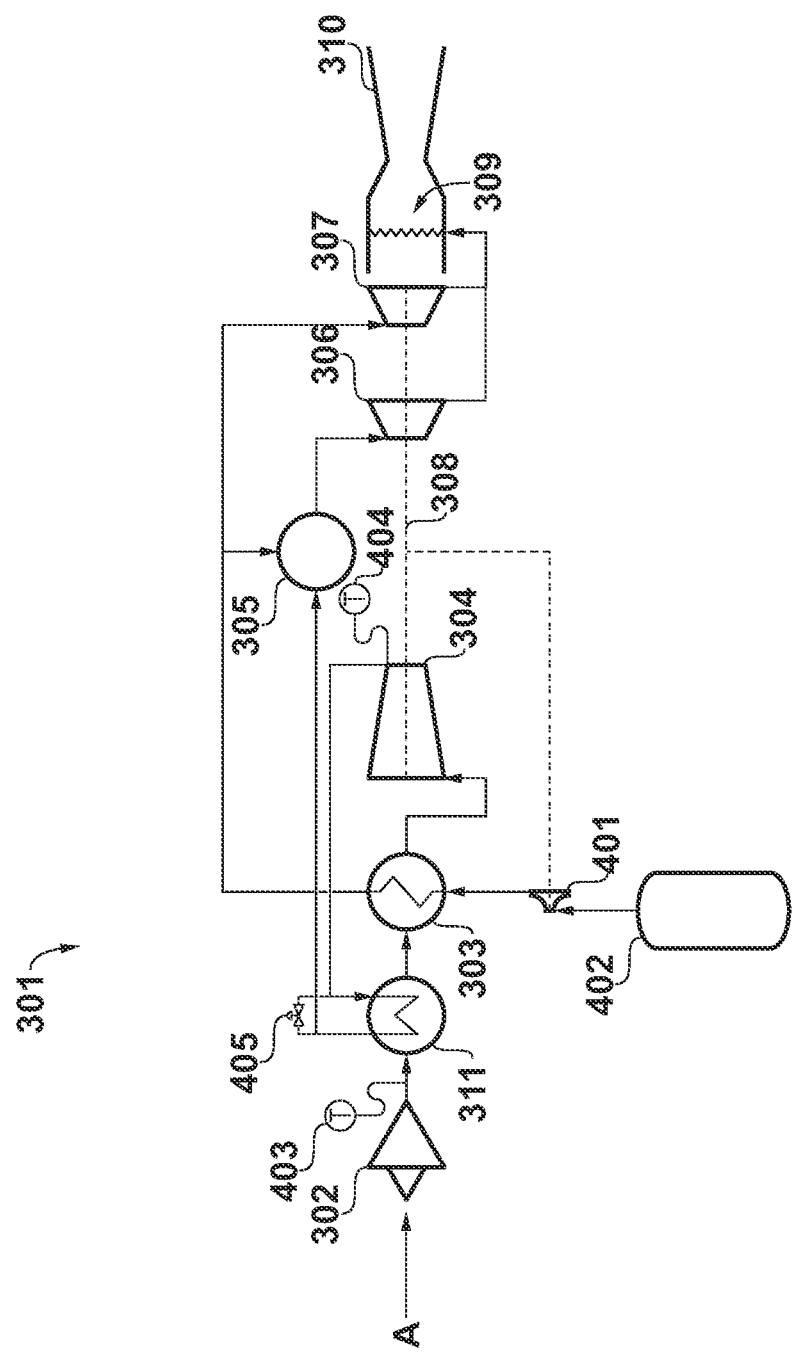
FIG. 4 shows the cycle of the engine of FIG. 3 in schematic form.

The components in engine 301 are shown in FIG. 4 schematic form, along with pump 401 and cryogenic storage tank 402.

The precooler 311 is provided to cool the compressed inlet air from the inlet 302 and to prevent overheating of the fuel in the cooler 303. This is achieved in this example by routing the compressed inlet air through a first pass of the precooler 311 and discharge air from the turbo-compressor 304 through a second pass of the precooler 311.

This configuration is possible because of the high degree of cooling in the cooler 303, which is such that, despite compression and therefore heating in the turbo-compressor 304, the compressed discharge air from the turbo-compressor 304 is still lower in temperature than the stagnation temperature at the inlet to the first pass of the precooler 311.

In an embodiment, a temperature sensor 403 at the inlet to the first pass of the precooler 311 is provided, along with a temperature sensor 404 at the outlet of the turbo-compressor 304. These enable control of a bypass valve 405 in a bypass around precooler 311. In this way, should at any point the post-turbo-compressor temperature exceed that prior to the precooler, the precooler may be bypassed and unnecessary heating of the inlet air avoided. This may assist in terms of extending the operational envelope of the engine 301.

Figure 5:
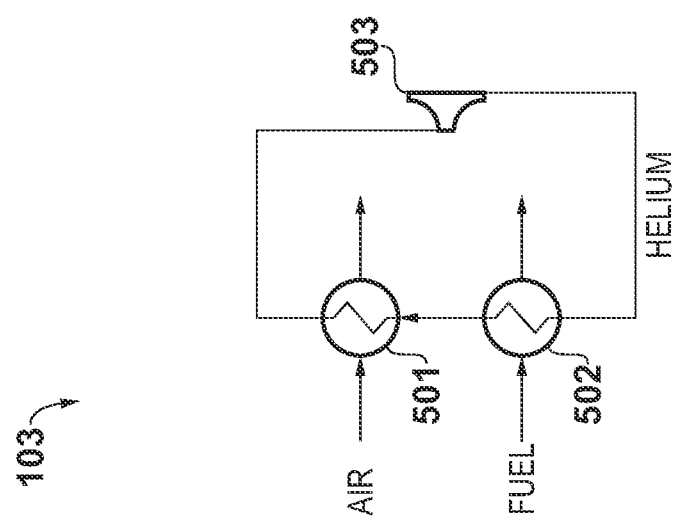
FIG. 5 shows a helium loop which may be used to segregate fuel and air in the cooler of the engines disclosed herein.

As described previously, the cooler 103 (and cooler 303) may directly transfer heat from the air flow to the fuel. Alternatively, an intermediate fluid may be used. A suitable configuration for this approach is shown in FIG. 5. The cooler 103 comprises a first heat exchanger 501 and a second heat exchanger 502, along with a pump 503 for pumping an intermediate fluid therethrough. In this example, the intermediate fluid is helium, although it will be appreciated that any other suitable fluid may be used.

In operation, compressed inlet air from the inlet 102 enters a first pass of the first heat exchanger 501, whilst the intermediate fluid enters a second pass of the same heat exchanger where it is heated. Cooled air exits and proceeds to the turbo-compressor 104. The intermediate fluid is circulated by the pump 503. Cryogenic liquid fuel pumped by pump 201 enters a first pass of the second heat exchanger 502, whilst the intermediate fluid enters a second pass of the same heat exchanger where it is cooled.

The configuration of FIG. 5 presents advantages in terms of avoiding a requirement for fuel to be circulated in the gas path through the cooler 103. In the present example, the inert helium intermediate fluid does not present an explosion risk should failure of the first heat exchanger 501 occur.

Various examples have been described, each of which comprise various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An air-breathing turbojet engine for a hypersonic vehicle, comprising:
   a pump for pumping a cryogenic fuel;
   an inlet configured to compress inlet air by one or more shocks, thereby producing compressed inlet air;
   a cooler configured to cool the compressed inlet air using the cryogenic fuel, thereby producing cooled air;
   a turbo-compressor configured to receive cooled air from the cooler and to compress the air further, thereby producing compressed cooled air;

a precooler between the inlet and the cooler, the precooler being configured to cool the compressed inlet air using compressed cooled air from the turbo-compressor;

a combustor configured to receive compressed cooled air and a first portion of the cryogenic fuel for combustion therein, thereby producing combustion products;

a first turbine configured to expand and be driven by combustion products from the combustor, and a second turbine configured to expand and be driven by a second portion of the cryogenic fuel, the first turbine and the second turbine being configured to drive the turbo-compressor via a shaft; and an afterburner configured to receive combustion products from the first turbine and the second portion of the cryogenic fuel from the second turbine for combustion therein.

2. The engine of claim 1, further comprising a bypass around the precooler for the compressed cooled air from the turbo-compressor which bypass is configured to bypass the precooler when compressed cooled air from the turbo-compressor has a temperature greater than a stagnation temperature at an inlet to the precooler.

3. The engine of claim 1, in which the cooler comprises a heat exchanger having a first pass for the inlet air and a second pass for the cryogenic fuel, whereby heat is transferred from the inlet air directly to the cryogenic fuel.

4. The engine of claim 1, in which the cooler comprises a first heat exchanger having a first pass for the inlet air and a second pass for an intermediate fluid, and a second heat exchanger having a first pass for the intermediate fluid and a second pass for the cryogenic fuel, whereby heat is transferred from the inlet air to the cryogenic fuel via the intermediate fluid.

5. The engine of claim 4, in which the intermediate fluid is helium.

6. The engine of claim 1, in which the cryogenic fuel is liquid hydrogen.

7. The engine of claim 1, in which the cryogenic fuel is liquid natural gas.

8. A vehicle comprising an engine according to claim 1.

9. A method of operating an air-breathing turbojet engine for a hypersonic vehicle, comprising:

pumping a cryogenic fuel;

compressing inlet air by one or more shocks to produce compressed inlet air;

cooling the compressed inlet air using the cryogenic fuel to produce cooled air;

compressing the cooled air further in a turbo-compressor to produce compressed cooled air;

precooling the compressed inlet air in a precooler using compressed cooled air from the turbo-compressor;

combusting the compressed cooled air and a first portion of the cryogenic fuel in a combustor to produce combustion products;

driving a first turbine by expanding the combustion products therethrough, and driving a second turbine by expanding a second portion of the cryogenic fuel;

driving the turbo-compressor by the first turbine and the second turbine via a shaft;

combusting the combustion products from the first turbine and the second portion of the cryogenic fuel from the second turbine in an afterburner.

10. The method of claim 9, further comprising bypassing the compressed cooled air from the turbo-compressor around the precooler when the compressed air has a temperature greater than a stagnation temperature at an inlet to the precooler.

11. The method of claim 9, in which heat is transferred from the inlet air directly to the cryogenic fuel.

12. The method of claim 9, in which heat is transferred from the inlet air to the cryogenic fuel via an intermediate fluid.

13. The method of claim 12, in which the intermediate fluid is helium.

14. The method of claim 9, in which the cryogenic fuel is liquid hydrogen.

15. The method of claim 9, in which the cryogenic fuel is liquid natural gas.

* * * * *